Nov. 10, 1942.  L. RICEFIELD  2,301,660
COUPLING
Original Filed June 21, 1941   2 Sheets-Sheet 1
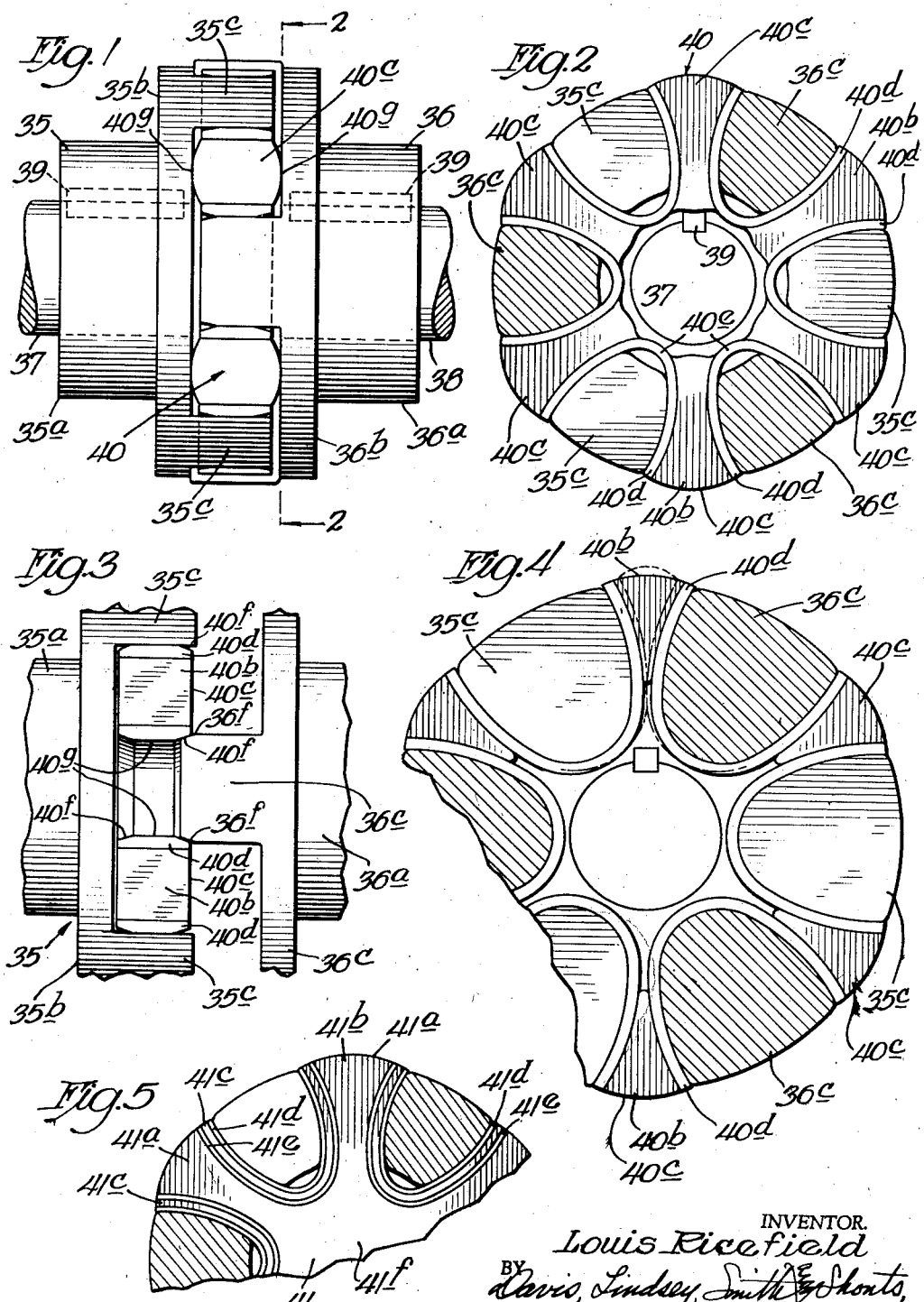
INVENTOR.
Louis Ricefield
BY Davis, Lindsey, Smith & Shonts,
ATTYS Nov. 10, 1942.                L. RICEFIELD                2,301,660
                               COUPLING
                   Original Filed June 21, 1941    2 Sheets-Sheet 2
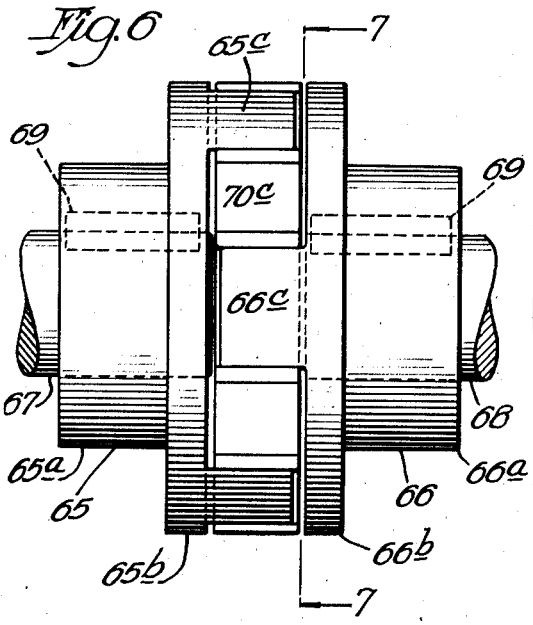
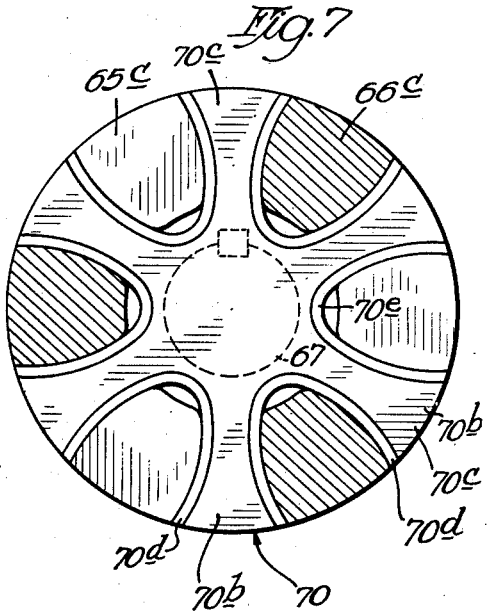
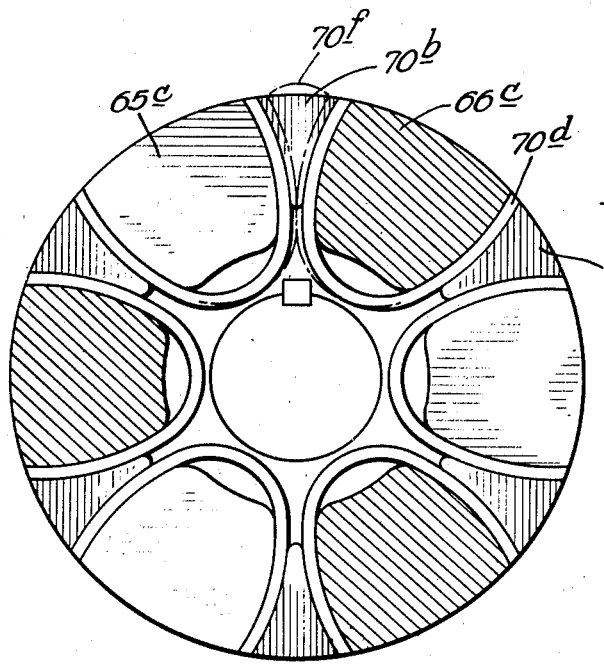
INVENTOR.
Louis Ricefield
BY
Davis, Lindsey, Smith & Shonts,
ATTYS Patented Nov. 10, 1942

2,301,660

UNITED STATES PATENT OFFICE 2,301,660

COUPLING

Louis Ricefield, Oak Park, Ill.

Original application June 21, 1941, Serial No. 399,154. Divided and this application December 19, 1941, Serial No. 423,612

14 Claims. (Cl. 64—14)

This invention relates to improvements in couplings and its purpose is to provide improved means for connecting substantially aligned shafts and compensating for relative lateral displacement and angular misalignment of said shafts while permitting relative endwise movement thereof. This application is a division of my copending application Serial No. 399,154, filed June 21, 1941, which is a continuation in part of my application Serial No. 325,324, filed March 22, 1940.

The invention of the present application is of particular advantage when embodied in couplings of the type disclosed in my prior United States Patents No. 2,025,824, No. 2,025,825, No. 2,025,826, No. 2,025,827, No. 2,025,828 and No. 2,025,829, all granted on December 31, 1935. In these prior patents there are disclosed various forms of couplings, each of which, generally speaking, comprises a pair of coupling members each secured upon one of two substantially aligned shafts, each coupling member having a plurality of longitudinally extending jaws which intermesh loosely with each other and contact with interposed resilient deformable power transmitting members through which forces are transmitted from one coupling member to the other. The power transmitting members may be constructed of separate members which are independent of each other and which are held against radial displacement by retaining devices, as disclosed in said original applications and in some of said patents, but the present application is directed particularly to that form of the invention in which the power transmitting members are formed as the radiating arms of a spider. As heretofore used, the power transmitting members employed with the coupling members of the type referred to have casually been formed of rubber, leather, laminated fabric bodies impregnated with rubber, or of other materials having appreciable resiliency and deformability and capable of being flattened and distorted when subjected to compressive stresses or other stresses imparted thereto during use. When transmitting substantially uniform power, power transmitting members of this type will render satisfactory service even after their thickness has been considerably reduced either by wear or by partial permanent deformation, but if this power is greatly fluctuating in extent and frequency, the power transmitting members, even though they are initially satisfactory, rapidly lose their ability to cushion the shocks of the fluctuations and to eliminate their effect upon the connected machinery.

When the force transmitted through connected shafts is repeatedly and suddenly applied, as in the operation of Diesel engines, for example, this force unless cushioned will create elastic deformation and thereby often set up excessive vibration in the connected shafts. To effect the desired cushioning action, an elastically yielding connection must be made between the engine shaft and the shaft of the driven machine which will permit relative torsional displacement between them, proportional to the power transmitted. In order that the connection may continue to be satisfactory, the yielding of the connection and the deformability of the power transmitting members, in case the connection is made by a coupling of the type referred to, must remain a fixed function of the power transmitted for a long period of service life.

Where the couplings are equipped with power transmitting members of the types referred to above, their material evidences the following behavior after extended service:

When made of leather and transmitting fluctuating power, a permanent deformation begins to develop in the power transmitting members from the very beginning of service, the rapidity and extent of which deformation depends not only upon the amount of maximum pressure applied to them but also, and to a greater extent, upon the frequency of its application. This permanent deformation is coincident with an increase in the density of the fibrous structure of leather which becomes hard and gradually loses its resilient deformability under all but the greatest power impulses of a fluctuating load, thereby setting up very objectionable vibrations in the connected shafts. If the power transmitted is uniform, however, the power transmitting members only have to compensate for misalignment of the shafts but do not need to alter the elastic torsional deflection in the shafts, and they do not require any more resilient deformability than is needed to compensate for misalignment. Thus, while couplings equipped with power transmitting members made of leather are very economical in size and cost, when transmitting uniform power, they are either objectionable or at best very costly in transmitting fluctuating power, because, in order to retard the hardening process of the leather, the power transmitting surfaces have to be greatly enlarged to reduce the pressure applied to leather, which in turn entails an enlargement of the coupling, often beyond the dimensions, weight, flywheel-effect and cost permissible.

When made of rubber, the power transmitting members, if subjected to sufficiently low pressures, will yield fairly satisfactory service in eliminating vibration due to fluctuating power, until surface friction on the jaw surfaces will have reduced their thickness and therefore their specific deformability to a point where they are unable to affect the elastic torsional deflection of the connected shafts. If the specific pressure on rubber be held to a very low value, the couplings become very large and costly.

In order to increase the specific pressure applicable to the power transmitting members, and thereby reduce the dimensions of the couplings, rubber is now being used in laminations bonded between laminations of fabric, possessing greater resistance to abrasion by friction on the jaw engaging surfaces than rubber, while possessing a slight amount of resilient deformability. Power transmitting members made of such laminations of rubber and fabric, bonded together into integral bodies, may safely be subjected to greater pressure under a uniform power than rubber alone could be, but if the transmitted power is fluctuating, a disintegration develops in the fabric laminations, until all fabric will have disappeared between the rubber laminations at the outer ends of the power transmitting members where the relative torsional movement of the jaw faces is the greatest. From that point on, the rubber laminations begin to tear off, bringing about the complete destruction of the power transmitting members, often before the outer laminations of fabric have been at all affected by surface friction on the jaw faces. This failure of the rubber laminations occurs at fluctuating loads even if the maximum of these loads is less than that applicable to solid rubber bodies. Thus, this form of power transmitting member also requires low specific pressure and therefore large coupling dimensions.

In some other types of couplings, wherein the desirable qualities of rubber for the transmission of fluctuating power are utilized, the power transmitting members, made of rubber, are freed from the destructive effect of surface friction on their faces which contact with the coacting jaws of the coupling bodies, either by being directly bonded to these jaw faces or by being secured thereto indirectly, such as by riveting or dovetailing structurally strong cover plates bonded to the power transmitting surfaces of the rubber members. Power transmitting members of this construction, however, also fail to yield a sufficiently long service life in proportion to the power transmitted. All of these forms, in contrast with those first discussed, eliminate relative movement between the power transmitting members and the coacting coupling jaws, by anchoring the shafts to each other longitudinally of their axis.

Since, however, angular misalignment of the shafts always requires a certain amount of longitudinal displacement of the jaws, and certain types of machinery such as electric generators often require free endwise movement of their shafts, in all couplings so anchoring the shafts to each other, the rubber portions of the power transmitting members are subjected to shear on their fixed contact surfaces while resisting the efforts of the shafts to oscillate longitudinally with respect to each other. Thus, while eliminating surface friction, this construction introduces fluctuating shearing stresses which, in addition to being destructive to rubber because of internal heat they generate, also impede a very essential function of misaligned shafts, namely, their free longitudinal adjustment during rotation.

Under uniform load, the power transmitting members, once deformed thereby, will only be subject to such additional deformation as the shafts may require for the compensation of their misalignment, but under fluctuating power, on the other hand, the power transmitting members must undergo, in addition to the above, a continuous process of deformation, varying in extent and frequency with the power transmitted.

This process of deformation is accompanied by a corresponding labor of friction between the parts composing the deformable portion of the power transmitting members, and by recurrent elongation and contraction of these parts in directions transverse to the transmitted power. While this internal labor of deformation, because of its destructiveness, is in itself accelerating a reduction in thickness of the power transmitting members, its effect is additionally detrimental to that capacity required of them when transmitting fluctuating power, which is that their deformability shall be a fixed function of the power transmitted. Since any permanent reduction in thickness reduces the deformability of a given material, power transmitting members subjected to such reduction will very rapidly fail to eliminate vibration, even while still capable of compensating for a misalignment of the shafts while transmitting power.

The present invention has for one of its objects to provide power transmitting members formed as spider arms which are adapted to retain their deformability as a substantially fixed function of the deforming force, regardless of the extent and frequency of the variations of this force. This is accomplished by the elimination of friction on the outer surfaces of the deformable parts of the spider arms, and particularly by a reduction of the internal labor of deformation to a value which is within the capacity of the material forming these deformable parts. This improvement involves the discovery that compressive stresses may be more efficiently transmitted by the use of a spider having radiating spider arms, each made of a plurality of laminations bonded together and formed of different materials, some of said laminations being resiliently deformable while others are hard and substantially incompressible or non-deformable. The resilient deformable laminations may be formed of rubber, or other like materials, and the substantially incompressible and non-deformable laminations, while not strictly having these characteristics to the last degree, are structurally strong and may be formed of such materials as hard rubber, spring steel, or layers of cotton fabric impregnated with a synthetic resin such as Textolite and other like materials capable of being bonded over their entire contacting surfaces with the adjacent deformable laminations, thus anchoring the laminations in a fixed relationship throughout the entire areas of their power transmitting surfaces. The hard and substantially incompressible laminations of the spider arms may preferably be outer laminations, one face of each of which contacts directly with a jaw of one of the coupling members to perform the function of withstanding the frictional wear under relative sliding movements, while the other face anchors the intermediate resilient and deformable lamination which serves not only to transmit the load but to permit such distortion of the spider arm as may be necessary to compensate for misalignment of the shafts and to absorb the shocks incident to fluctuating loads.

In a power transmitting spider having laminated spider arms of the type just referred to, the resilient deformable laminations act as columns extending in the directions in which forces are transmitted, and since their end surfaces are bonded over their entire areas to the hard or substantially incompressible laminations, their lateral buckling is greatly reduced and limited as compared with what it would be if the ends of these columns were free; that is, if the laminations were loosely assembled. The failure of such a column is caused not only by the shearing stresses set up therein due to the compression but, also, by the tensile stresses in the outer fibers of the column arising from the buckling action, and these tensile stresses may greatly exceed the shearing stresses as soon as the buckling becomes appreciable. By limiting the buckling action through the fixing of the end surfaces of the column, or by superimposing a plurality of short columns fixed at their ends, the present invention brings about a reduction in the internal stresses in the resilient deformable laminations and a consequent increase in the life of a power transmitting member without thereby reducing the torsional resiliency required of the coupling. The hard or substantially incompressible laminations thus perform the function of anchoring the ends of the columns represented by the intermediate deformable laminations, and when these hard laminations contact directly with the jaw faces, they limit the frictional wear upon relative movement of the jaws and the spider arms. Since the hard laminations anchor the deformable laminations, it is important that they be able to withstand shearing stresses in planes parallel to their bonding surfaces. While steel and other metals possess both the strength and the capacity for bonding strongly with rubber, their coefficients of friction, in the absence of a lubricant, are very high, and it is therefore considered preferable to use hard laminations which are formed of fabric layers impregnated with a synthetic resin, since these materials have a very low coefficient of friction and have certain natural vibration characteristics which are preferable to those of metals. This improved construction makes it possible to apply compressive forces to the spider arms which approach the capacity of the rubber for static compression, thereby greatly increasing the dynamic load which is applicable to the coupling without interfering with the requisite functions of the couplings as a connection for the substantially aligned shafts.

If the power transmitted is uniform, both in direction and magnitude, the spider arms may be of such thickness as to be equal to or less than the gap between the adjacent opposed jaw faces, and the outer laminations of the spider arms may preferably be formed as comparatively thin layers of hard, substantially incompressible material. Under those conditions, the spider arms are reduced in thickness under the influence of the load transmitted so that gaps are produced between the inactive faces of the jaws and the adjacent faces of the spider arms, which vary in extent with the possible fluctuations of the load. These gaps are closed upon the reduction or reversal of the load, thereby tending to produce an objectionable slapping noise and an intermittent interruption in the power transmitting connection between the coupling members. When the coupling is used under such a fluctuating load, it is desirable to intercept power impulses uninterruptedly, and it is advantageous to put the spider arms under initial compression when they are placed between the jaws of the coupling members. Since the extent of reduction under compression of the laminations of deformable material is a function of its thickness and of the ratio of this dimension to the dimensions transverse thereto, any reduction of the thickness from which deformation begins under minimum value of the pressure applied will reduce the extent and thus the internal labor of deformation between the minimum and the maximum values. Since the deformability of such materials also generally reduces with increasing pressure, it follows that if the spider arms are put under initial compression, when there is no load on the coupling, the extent of their deformation under the maximum load, and thus the internal labor of their deformation, will be less than it would be if they were continuously deformed from a free unloaded state. Another advantage of this pre-compression of the spider arms is that it insures that the power will always flow from one shaft to the other through a resilient medium, regardless of its direction or magnitude.

This initial compression is made possible by forming the spider arms of a greater normal thickness than the normal distance between the opposed jaw faces, so that the spider arm may be wedged into place between the jaws when there is no load on the coupling, with a resultant increase in the life of the spider. A spider of this type may be readily put in place and may be constructed to cause all of the forces to be transmitted through the hard incompressible parts of the spider arm after a predetermined deformation of the intermediate deformable parts has taken place. The present invention not only increases the life of the coupling but also has the advantage of improving the efficiency of other machines or machine elements to which the coupling may be connected by reason of the reduction or substantial elimination of vibrations through the damping of these vibrations in the parts of the spider arms. Other objects and advantages of the invention will appear more fully hereinafter.

The nature of the invention will be understood from the following specification taken with the accompanying drawings in which several embodiments of the invention are illustrated. In the drawings:

Fig. 1 shows a side elevation of one form of coupling embodying the features of the present invention where the power transmitting members are subjected to an initial compression when they are placed in position between the jaws of the coupling members;

Fig. 2 shows a sectional view taken on the line 2—2 of Fig. 1;

Fig. 3 is a partial side elevation of the coupling shown in Figs. 1 and 2, illustrating the method of assembly of the device;

Fig. 4 is a partial enlarged sectional view, similar to that of Fig. 2, adapted to have a predetermined limited deformation;

Fig. 5 is a partial sectional view, similar to that of Fig. 4, showing a modified form of construction in which a greater number of laminations are embodied in the construction of each spider arm;

Fig. 6 is a side elevation, similar to that of Fig.

1, showing another form of the invention wherein the spider arms are not subjected to initial compression when they are placed between the jaws of the coupling members;

Fig. 7 is a vertical section taken on the line 7—7 of Fig. 6; and

Fig. 8 is a sectional view similar to that of Fig. 7 showing the conditions of the parts when the spider arms are subjected to compression by the transmission of power through the coupling.

In the form of the invention shown in Figs. 1, 2, 3 and 4, the invention is illustrated as comprising two coupling members 35 and 36 which are secured to a pair of substantially aligned shafts 37 and 38, respectively, by means of keys 39. These coupling members have hub portions $35^a$ and $36^a$, respectively, which are formed integrally with radially extending disks $35^b$ and $36^b$ provided with integral longitudinally extending jaws $35^c$ and $36^c$, respectively. These jaws intermesh loosely with each other and are adapted to receive between them power transmitting members $40^c$ which are formed as the radiating arms of a power transmitting spider 40. The intermediate portions $40^b$ of the spider arms $40^c$ are formed of rubber or the like and they are united with the corresponding parts of adjacent arms $40^c$ by outer laminations $40^d$ which are vulcanized or otherwise secured to intermediate laminations $40^b$ so that the adjacent arms $40^c$ are connected with each other by this continuous integral member extending between adjacent spider arms, the intermediate connecting portions $40^e$ of these outer laminations extending between the inner ends of adjacent parts $40^d$.

In the embodiment illustrated, the arms $40^c$ are constructed so that they increase gradually in thickness, measured circumferentially of the spider, from their inner ends outwardly, and they may be so proportioned as to cause substantially uniform compressive stresses to be set up in all parts of the spider arm when the coupling is under load, as explained in certain of my prior patents above mentioned, but the laminated type of construction illustrated may also be utilized for limiting the deformation of the spider arms after a predetermined load has been put upon the coupling. This is accomplished by forming the outer laminations $40^d$ of the spider arm of hard and substantially incompressible materials such as layers of fabric united with each other and impregnated with a synthetic resin or other equivalent material which provides a lamination having great wear-resisting qualities and the advantage that it may be united with the intervening layer $40^b$ of rubber or the like by vulcanization, so that a unitary spider arm construction is provided. When thus formed, the effect of a load being transmitted to the coupling from the jaws of one coupling member to the jaws of the other coupling member is to deform the intermediate laminations $40^b$ of the spider arm and to force the materials of these layers outwardly, as shown in Fig. 4, until, under extreme load, the outer hard layers $40^d$ of the power transmitting surfaces of the spider arms are in contact with each other, thus preventing any further substantial compression of the spider arms, which is an advantage under many conditions of use.

In Fig. 3, there is shown the method of assembly of the form of coupling shown in Figs. 1, 2 and 4. As there illustrated, the outer laminations $40^d$ of the spider arms are beveled in a general radial direction as shown at $40^f$, thus decreasing the width of the surfaces $40^g$ which contact with the faces of the jaws $35^c$ and $36^c$, the latter faces being constructed to conform substantially to the curvature of the faces of the laminations $40^d$. The jaws $36^c$ of one coupling member have their lateral faces beveled also, as shown at $36^f$, and the construction is such that after the spider has been put in place in one coupling member 35, as shown in Fig. 3, the spaced faces of two opposite spider arms are then closer together than the distance between the opposite faces of one jaw $36^c$ carried by the other coupling member, so that when the last-mentioned coupling member 36 is moved endwise it is necessary to wedge the jaws $36^c$ between the faces $40^g$ of the spider arms, thus setting up an initial compression in the intermediate laminations $40^b$ which may cause them to be deformed and to bow outwardly toward the disks $35^b$ and $36^b$ of the coupling members, as shown at $40^g$ in Fig. 1.

In Fig. 5 of the drawings there is shown a modified form of spider adapted to be used with the coupling members shown in Figs. 1, 2, 3 and 4. In this modified form, the spider arms are formed of a plurality of laminations of rubber combined with a plurality of other laminations which are substantially incompressible or non-deformable, thus illustrating the possibility of obtaining in a spider, as well as in individual power transmitting members, various degrees of strength and deformability by varying the number, thickness, resiliency and deformability of the laminations. In this form, the spider 41 comprises a plurality of radiating arms $41^a$ each made up of a central lamination $41^b$ and two other laminations $41^c$, formed of rubber, which are bonded over their contacting surfaces with other laminations $41^d$ and $41^e$ formed of hard material of the kind previously referred to. The laminations $41^b$ are formed as projections on the central hub portion $41^f$ and the laminations $41^d$ and $41^e$ are continuous between adjacent spider arms as in the form just described. The compression of the spider arms, under extreme load, may be limited by the outward bowing of the deformable laminations until parts of the hard laminations are in contact with each other as previously explained in connection with the form shown in Fig. 4.

The form of the invention shown in Figs. 6, 7 and 8 of the drawings is similar in its general characteristics to the form of the invention shown in Figs. 1, 2, 3 and 4, except that the spider arms which form the power transmitting members are not under initial compression when there is no load on the coupling. In this form of the invention, the coupling is illustrated as comprising two coupling members 65 and 66 which are secured to a pair of substantially aligned shafts 67 and 68, respectively, by means of keys 69. These coupling members have hub portions $65^a$ and $66^a$, respectively, which are formed integrally with radially extending disks $65^b$ and $66^b$ provided with integral longitudinally extending jaws $65^c$ and $66^c$, respectively. These jaws intermesh loosely with each other and are adapted to receive between them power transmitting members $70^c$ which are formed as the radiating arms of a power transmitting spider 70. The intermediate portions $70^b$ of the spider arms $70^c$ are formed as rubber members united with a central hub of the same material, and they are also united with the corresponding parts of adjacent arms $70^c$ by outer laminations $70^d$ which are vulcanized or otherwise secured to the intermediate laminations 70b. In this way, the adjacent arms 70c are connected with each other by these continuous integral members 70d extending between the adjacent spider arms. When the device is assembled, the looped portions 70e of the laminations 70d extend between the parts which engage the jaw faces and are located radially inward therefrom.

As illustrated, the arms 70c are constructed so that they increase gradually in thickness, measured circumferentially of the spider, from their inner ends outwardly, and they may be so proportioned as to cause substantially uniform stresses to be set up in all parts of each spider arm when the coupling is under load, as explained in certain of said prior patents mentioned above. The outer laminations 70d of the spider arms are hard and substantially incompressible and they may be formed preferably of layers of fabric united with each other by and impregnated with a synthetic resin or other equivalent material, as in the formation of the hard and substantially incompressible laminations described above.

The thickness of the spider arms measured circumferentially of the coupling is such that they may be readily inserted between the jaws of opposite coupling members without any additional compression, following the method of assembly which has heretofore been explained in connection with the form of construction shown in Figs. 1 to 4, inclusive. When thus assembled, the intermediate laminations 70b which are formed of relatively soft resilient and deformable material, such as rubber, are not initially deformed and assume their normal shapes. In the embodiment illustrated, the thickness of the spider arms, measured circumferentially, is such as to occupy all of the space between adjacent jaws of opposite coupling members when there is no load on the coupling. When a load is applied, the intermediate laminations 70b of alternate spider arms are compressed so that they bulge outwardly, as shown at 70f in Fig. 8. During this compression, these intermediate laminations act as columns with their end faces attached over their entire areas to the relatively hard and incompressible laminations 70d which, although substantially incompressible, should have sufficient flexibility to adjust themselves to the compression and deformation of the intermediate laminations 70b. In an extreme condition of the compression of the intermediate laminations 70b, the laminations 70d of adjacent spider arms will be moved substantially into contact with each other, thus preventing any further substantial compression of the spider arms.

In each form of the invention, there is attained the advantage of the use in each power transmitting member of one or more resilient deformable laminations which act as columns with their end faces attached to relatively hard and incompressible anchoring laminations so that the lateral bending or buckling of the resilient deformable laminations under compression is limited and the wear caused by tension due to buckling and by internal friction is substantially reduced. At the same time, these laminations have the quality of restricting frictional wear caused by their contact with the metallic jaws of the coupling members and they adjust themselves automatically to the load on the coupling so that, except in the cases of fluctuating and reversing loads, each power transmitting member normally maintains a contact with two opposite jaws carried by opposite coupling members. These advantages may be gained with or without the advantage of an initial compression of the power transmitting members when they are inserted between the jaws, which initial compression will then maintain the contact between the power transmitting members and the jaws even when the load is fluctuating or reversing in character. The improvements herein described are applicable to couplings having other forms of jaw surfaces and other forms of spiders or other power transmitting members such as those in which the opposite jaw engaging faces of each spider arm are parallel to each other, such as that shown in said Patent No. 2,025,824, or have some other relative arrangement not herein shown in detail.

Although several forms of the invention have been shown and described by way of illustration, it will be understood that it may be constructed in various other embodiments which come within the scope of the appended claims.

I claim:

1. The combination in a coupling for connecting substantially aligned shafts and permitting free relative endwise movement thereof, of a pair of coupling members each adapted to be secured upon a separate one of said shafts, each of said coupling members comprising a plurality of longitudinally extending jaws adapted to intermesh loosely with the jaws of the other coupling member, and a power transmitting spider mounted between said coupling members and comprising a plurality of radiating laminated arms each interposed between two jaws carried by opposite coupling members, each arm of the spider comprising an inner lamination formed of resilient deformable material and outer jaw-engaging laminations formed of hard substantially non-deformable material, said inner laminations being of varying thickness, said inner laminations and said outer laminations being bonded together on their power transmitting surfaces, said spider arms being free to move bodily on the faces of the jaws with which they contact.

2. The combination in a coupling for connecting substantially aligned shafts and permitting free relative endwise movement thereof, of a pair of coupling members each adapted to be secured upon a separate one of said shafts, each of said coupling members comprising a plurality of longitudinally extending jaws adapted to intermesh loosely with the jaws of the other coupling member, and a power transmitting spider mounted between said coupling members and comprising a plurality of radiating laminated arms each interposed between two jaws carried by opposite coupling members, each arm of the spider comprising an inner lamination formed of resilient deformable material and outer jaw-engaging laminations formed of hard substantially non-deformable material, said inner laminations being of greater thickness toward their outer ends, said inner laminations and said outer laminations being bonded together on their power transmitting surfaces, said spider arms being free to move bodily on the faces of the jaws with which they contact.

3. The combination in a coupling for connecting substantially aligned shafts and permitting free relative endwise movement thereof, of a pair of coupling members each adapted to be secured upon a separate one of said coupling members comprising a plurality of longitudinally extending jaws adapted to intermesh loosely with the jaws of the other coupling member, and a power transmitting spider mounted between said coupling members and comprising a plurality of radiating laminated arms each interposed between two jaws carried by opposite coupling members, each arm of the spider comprising an inner lamination formed of resilient deformable material and outer jaw-engaging laminations formed of hard substantially non-deformable material, said inner lamination and said outer laminations being bonded together on their power transmitting surfaces, said spider arms being free to move bodily on the faces of the jaws with which they contact, the normal thickness of each spider arm being greater than the distance between the jaws engaged thereby whereby the spider arms are under initial compression when there is no load on the coupling.

4. The combination in a coupling for connecting substantially aligned shafts and permitting free relative endwise movement thereof, of a pair of coupling members each adapted to be secured upon a separate one of said shafts, each of said coupling members comprising a plurality of longitudinally extending jaws adapted to intermesh loosely with the jaws of the other coupling member, and a power transmitting spider mounted between said coupling members and comprising a plurality of radiating laminated arms each interposed between two jaws carried by opposite coupling members, each arm of the spider comprising an inner lamination formed of resilient deformable material and outer jaw-engaging laminations formed of hard substantially non-deformable material, said inner lamination and said outer laminations being bonded together on their power transmitting surfaces, said spider arms being free to move bodily on the faces of the jaws with which they contact.

5. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, each of said spider arms being made up of a plurality of deformable and non-deformable laminations so bonded to each other as to produce a fixed anchorage of the deformable laminations over their entire power transmitting surfaces with the contacting non-deformable laminations, each of said spider arms being free to adjust its position bodily on the faces of the jaws with which it contacts except as it is restrained by the other parts of the spider, each of said spider arms being of greater normal thickness than the distance between opposite jaws engaged thereby so that the spider arm is under compression when there is no load on the coupling, said spider arms increasing in thickness from their inner parts outwardly.

6. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, each of said spider arms comprising a plurality of resilient deformable laminations and a plurality of hard and substantially incompressible laminations arranged alternately, said laminations being bonded together over surfaces extending transversely to the directions in which power is transmitted.

7. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, each of said spider arms being free to move bodily on the surfaces of the jaws with which it contacts and comprising a plurality of resilient deformable laminations and a plurality of hard and substantially incompressible laminations arranged alternately, said laminations being bonded together over surfaces extending transversely to the directions in which power is transmitted.

8. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, each of said spider arms comprising a plurality of resilient deformable laminations and a plurality of hard and substantially incompressible laminations arranged alternately, said laminations being bonded together over surfaces extending transversely to the directions in which power is transmitted, the outer laminations of each spider arm being of hard substantially incompressible material.

9. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, each of said spider arms having deformable parts adapted to permit the compression of the spider arm between opposite jaws when forces are transmitted through the coupling and other parts adapted to limit the deformation of the spider arm after a predetermined deformation.

10. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, said spider arms being made up of a plurality of deformable and non-deformable laminations, each of said spider arms being free to adjust its position bodily on the faces of the jaws with which it contacts except as it is restrained by the other parts of the spider, the outer hard laminations of each spider arm being adapted to contact with each other at some part of each spider arm after a predetermined compression of the deformable portion of that spider arm.

11. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, each of said spider arms being free to adjust its position bodily on the faces of the jaws with which it contacts except as it is restrained by the other parts of the spider, the intermediate deformable laminations of said spider arms increasing in thickness from their inner margins outwardly and being so formed that the outer hard laminations of each spider arm are adapted to contact with each other at some part of each spider arm after a predetermined compression of the deformable laminations.

12. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, said spider arms being made up of a plurality of deformable and non-deformable laminations, each of said spider arms being free to adjust its position bodily on the faces of the jaws with which it contacts except as it is restrained by the other parts of the spider, each of said spider arms being of greater normal thickness than the distance between opposite jaws engaged thereby so that the spider arm is under compression when there is no load on the coupling, the intermediate deformable laminations of said spider arms increasing in thickness from their inner margins outwardly and being so formed that the outer hard laminations of each spider arm are adapted to contact with each other at some part of each spider arm after a predetermined compression of the deformable laminations.

13. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, each of said spider arms being free to move bodily on the surfaces of the jaws with which it contacts and comprising a plurality of resilient deformable laminations and a plurality of hard and substantially incompressible laminations arranged alternately, said laminations being bonded together over surfaces extending transversely to the directions in which power is transmitted, some of said hard laminations of each spider arm being adapted to contact with each other after a predetermined compression of the spider arm to limit the compression of that spider arm.

14. The combination in a coupling for connecting substantially aligned shafts and permitting relative endwise movement and angular displacement of said shafts, of a pair of coupling members each adapted to be secured upon a separate one of said shafts, each of said coupling members comprising a plurality of longitudinally extending jaws adapted to intermesh loosely with the jaws of the other coupling member, and a power transmitting spider having a plurality of radiating arms each interposed between jaws carried by opposite coupling members, each of said spider arms being made up of a plurality of deformable and non-deformable laminations so bonded to each other as to produce a fixed anchorage of the deformable laminations over their entire power transmitting surfaces with the contacting non-deformable laminations, each of said spider arms being free to adjust its position bodily on the faces of the jaws with which it contacts except as it is restrained by the other parts of the spider, said spider arms increasing in thickness from their inner parts outwardly.

LOUIS RICEFIELD.